United States Patent
Liu et al.

(10) Patent No.: US 11,397,577 B2
(45) Date of Patent: Jul. 26, 2022

(54) MANAGING PARALLEL MICROSERVICE REQUESTS

(71) Applicant: International Business Machines Corporation, Armonk, NY (US)

(72) Inventors: Xin Peng Liu, Beijing (CN); Yue Wang, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/006,968

(22) Filed: Aug. 31, 2020

(65) Prior Publication Data

US 2022/0066775 A1 Mar. 3, 2022

(51) Int. Cl.
*G06F 9/50* (2006.01)
*G06F 9/28* (2006.01)
*G06F 13/42* (2006.01)
*G06F 9/38* (2018.01)

(52) U.S. Cl.
CPC .............. *G06F 9/28* (2013.01); *G06F 9/3836* (2013.01); *G06F 9/5011* (2013.01); *G06F 9/5055* (2013.01); *G06F 13/4204* (2013.01); *G06F 2209/508* (2013.01); *G06F 2209/5022* (2013.01)

(58) Field of Classification Search
CPC .................................................. G06F 9/5011
See application file for complete search history.

(56) References Cited

U.S. PATENT DOCUMENTS

| 9,363,301 | B2 | 6/2016 | Lawson |
| 2019/0068438 | A1 | 2/2019 | Kumar |
| 2019/0179663 | A1* | 6/2019 | Xu .......................... G06F 9/4806 |
| 2020/0195526 | A1* | 6/2020 | Eberlein ............. H04L 41/5054 |
| 2020/0336553 | A1* | 10/2020 | Yeddula .................. H04L 43/50 |
| 2021/0135983 | A1* | 5/2021 | Farnham ............... H04L 45/302 |

OTHER PUBLICATIONS

"Best Practices for Microservice Performance", Google Cloud, Last updated Mar. 3, 2020, 5 pages.

(Continued)

*Primary Examiner* — Jacob Petranek
(74) *Attorney, Agent, or Firm* — Wiliam H. Hartwell; Brian M. Restaura

(57) ABSTRACT

A method, computer program product, and system for managing parallel microservices are provided. The method may include identifying information pertaining to each of a plurality of target microservices to be invoked by an issuer microservice, a predefined condition associated with the plurality of target microservices, and an action to be executed by the issuer microservice in response to the predefined condition being satisfied. The method may also include sending a first request to available target microservices of the plurality of target microservices based on the information pertaining to the respective available target microservices. The method may also include, in response to receiving a response to the first request from an available target microservice of the available target microservices, determining whether the predefined condition is satisfied, and in response to determining that the predefined condition is satisfied, causing the action to be executed by the issuer microservice.

20 Claims, 10 Drawing Sheets

(56) References Cited

OTHER PUBLICATIONS

"IBM Analytics Engine overview", IBM Cloud, Last Updated: May 12, 2020, 3 pages.
"Making parallel service calls in microservice architecture", Kuros, Aug. 20, 2019, 10 pages.
McDonald, Carol, "Event Driven Microservices Architecture Patterns and Examples", This blog post was published Feb. 8, 2017, 12 pages.
Mell et al., "The NIST Definition of Cloud Computing", Recommendations of the National Institute of Standards and Technology, Special Publication 800-145, Sep. 2011, 7 pages.
Sampaio, Jr. et al., "Improving microservice-based applications with runtime placement adaptation", Journal of Internet Services and Applications, (2019) 10:4, 30 pages, <https://doi.org/10.1186/s13174-019-0104-0>.

* cited by examiner

```
kind: Deployment
apiVersion: apps/v1
metadata:
  name: A
  namespace: test
  labels:
    app: A
spec:
  ...
  template:
    spec:
      containers:
        -
          name: A
          ...
          livenessProbe:
            tcpSocket:
              port: 8080
```

*FIG. 6A*

```
kind: Deployment
apiVersion: apps/v1
metadata:
  name: B
  namespace: test
  labels:
    app: B
spec:
  containers:
    -
    ...
```

*FIG. 6B*

```
kind: Deployment
apiVersion: apps/v1
metadata:
  name: A
  namespace: test
  labels:
    app: A
spec:
...
  template:
    spec:
      containers:
      -
        name: A
        ...
        livenessProbe:
          tcpSocket:                801
            port: 8080
          dispatchForJoin:
            dispatchMatcher:
              labelRegex: B
            init_pod_number: 4      802
          joinProbe:
            command:
            - sh
            - "-c"
            - /app/query_end_check.sh
```

```
kind: Deployment
apiVersion: apps/v1
metadata:
  name: B
  namespace: test
  labels:
    app: B
spec:
  containers:                803
  -
  ...
    dispatchForJoinCancellation:
      command:
        - sh
        - "-c"
        - /app/query_cancellation.sh
```

```
!/bin/bash

#------------------------------------------------------------------# This is a
sample merge condition check shell script. It assumes the current
user account id to be used for query of billing records is placed
within environment var $CURRENT_ACCOUNT_ID. If the check
finds merge condition met, will print "TRUE" to standard output
which will be read by cloud infrastructure to cease the query to
unreturned services and cancel them.
------------------------------------------------------------------ end_query_ceck_sql = 'SELECT COUNT(*) FROM
LOCAL_MERGED_RESULTS WHERE
ACCOUNT_ID="'$CURRENT_ACCOUNT_ID'"'
account_num = execute_sql_query(end_query_ceck_sql)

if [ "$account_num" != "0" ]; then
  echo 'TRUE'
else
  echo 'FALSE'
fi
```

*FIG. 9A*

```
!/bin/bash

#------------------------------------------------------------------
# This is a sample cancel service execution shell script. It assumes the
current process in querying of billing record for certain account is
query_billing_record. This sample just query all such processes in
running, obtain the proceess ids, and simply kill them.
------------------------------------------------------------------ query_process_ids=($(ps -ef | grep query_billing_record | awk '{ print
$2 }'))
for idx_process_id in ${!query_process_ids[@]};do
  process_id=${query_process_ids[$idx_process_id]}
  kill -7 process_id
done
```

*FIG. 9B*

MANAGING PARALLEL MICROSERVICE REQUESTS

BACKGROUND

The present invention relates generally to the field of cloud computing technology, and more particularly to managing parallel cloud microservices.

Cloud computing technology has become very popular in recent years. A growing number of applications may adopt a cloud computing business model, and IT architectures used by these applications may be moved to modern cloud computing environments where more functionalities may be decoupled and wrapped as microservices.

SUMMARY

According to an aspect of the present disclosure, there are a method, computer program product and system that perform the following operations (not necessarily in the following order): identifying (i) information pertaining to each of a plurality of target microservices to be invoked by an issuer microservice, (ii) a predefined condition associated with the plurality of target microservices, and (iii) an action to be executed by the issuer microservice in response to the predefined condition being satisfied; sending a first request to available target microservices of the plurality of target microservices based, at least in part, on the information pertaining to the respective available target microservices; in response to receiving a response to the first request from an available target microservice of the available target microservices, determining whether the predefined condition is satisfied; and in response to determining that the predefined condition is satisfied, causing the action to be executed by the issuer microservice.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure. The various features of the drawings are not to scale as the illustrations are for clarity in facilitating one skilled in the art in understanding the disclosure in conjunction with the detailed description. The drawings are discussed forthwith below.

FIG. 6A depicts an existing exemplary issuer microservice deployment descriptor for an issuer microservices A, according to some embodiments of the present disclosure.

FIG. 6B depicts an existing exemplary target microservice deployment descriptor for one of designated target microservices B 5041-5044, according to some embodiments of the present disclosure.

FIG. 8A depicts a proposed exemplary issuer microservice deployment descriptor for an issuer microservices A, according to some embodiments of the present disclosure.

FIG. 8B depicts a proposed exemplary target microservice deployment descriptor for one of designated target microservices B 7041-7044, according to some embodiments of the present disclosure.

FIG. 9A depicts an exemplary file named query_end_check.sh, according to some embodiments of the present disclosure.

FIG. 9B depicts an exemplary file named query_cancellation.sh, according to some embodiments of the present disclosure.

DETAILED DESCRIPTION

Figure 1:
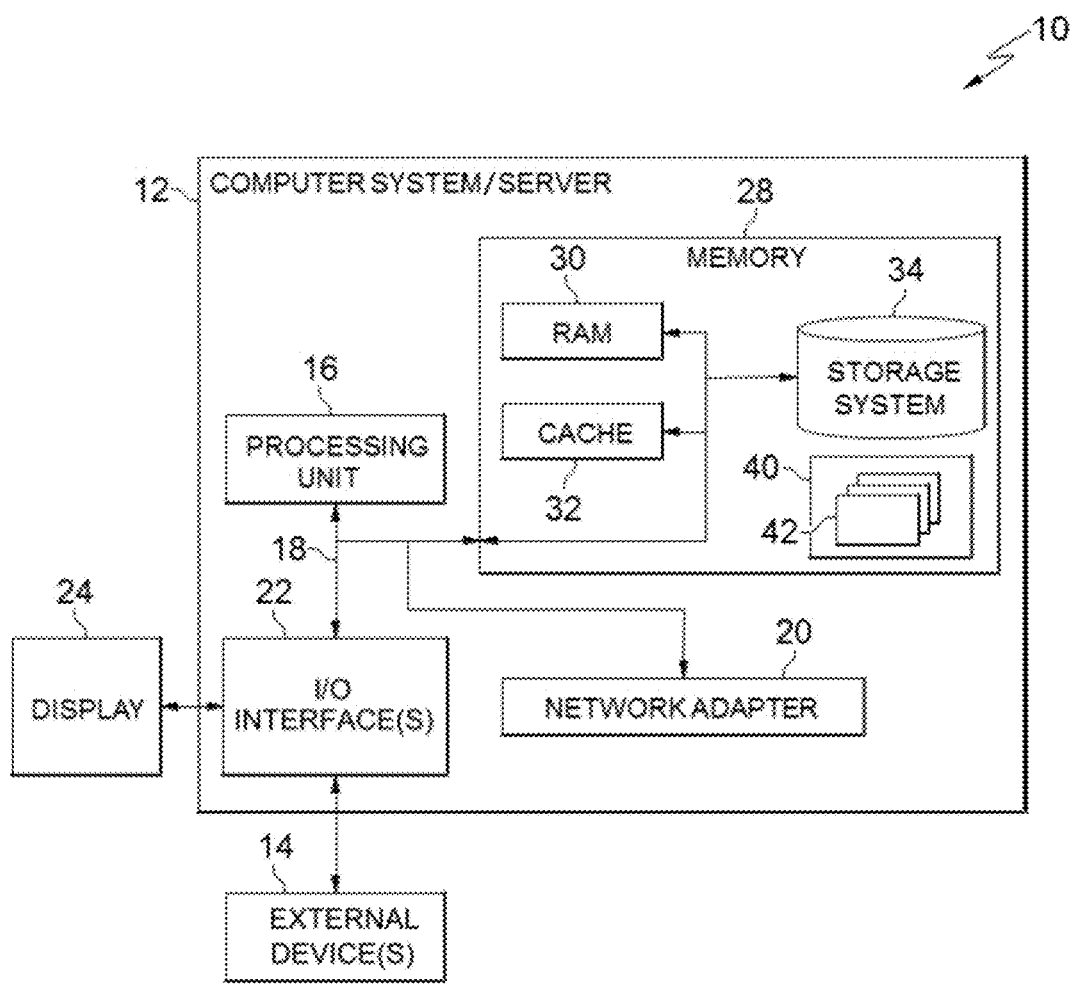
FIG. 1 depicts a cloud computing node, according to some embodiments of the present disclosure.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
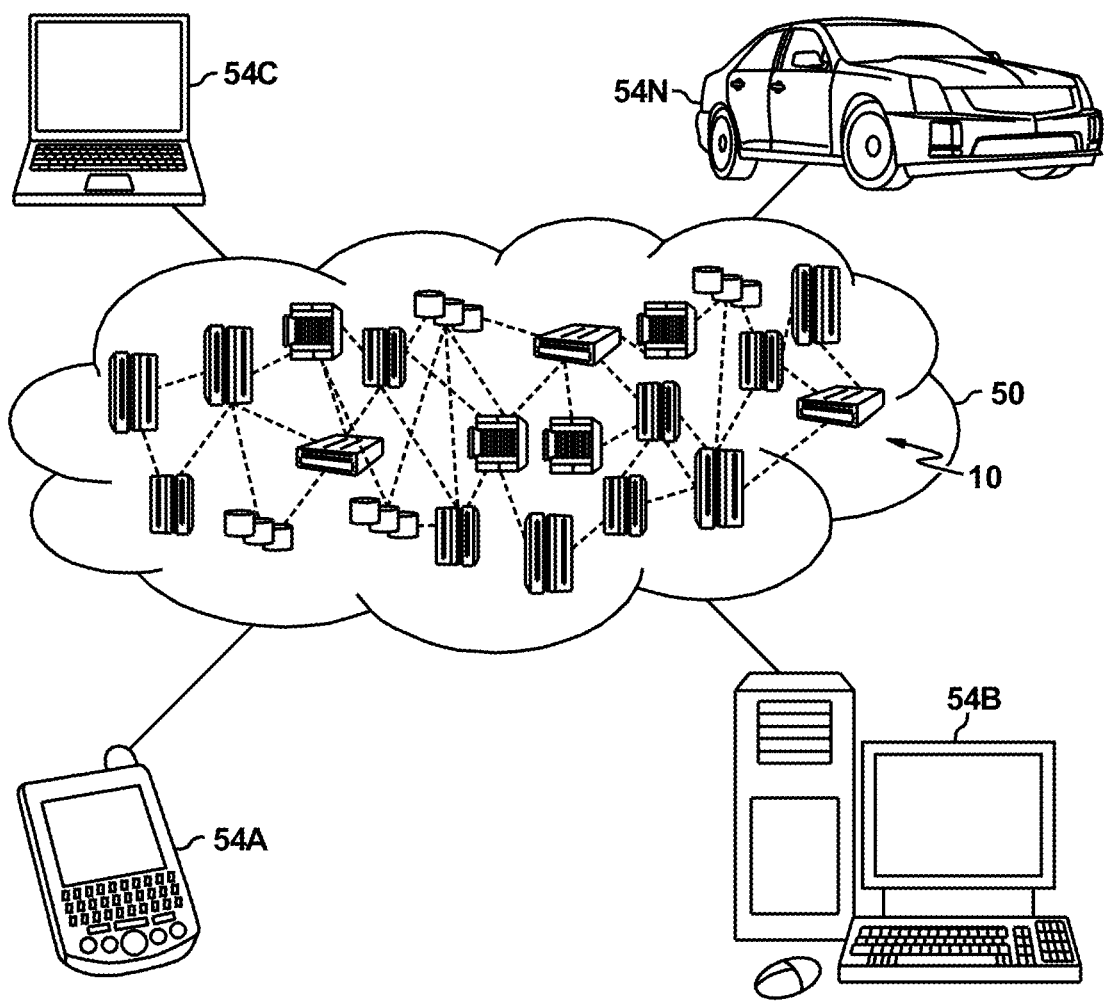
FIG. 2 depicts a cloud computing environment, according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
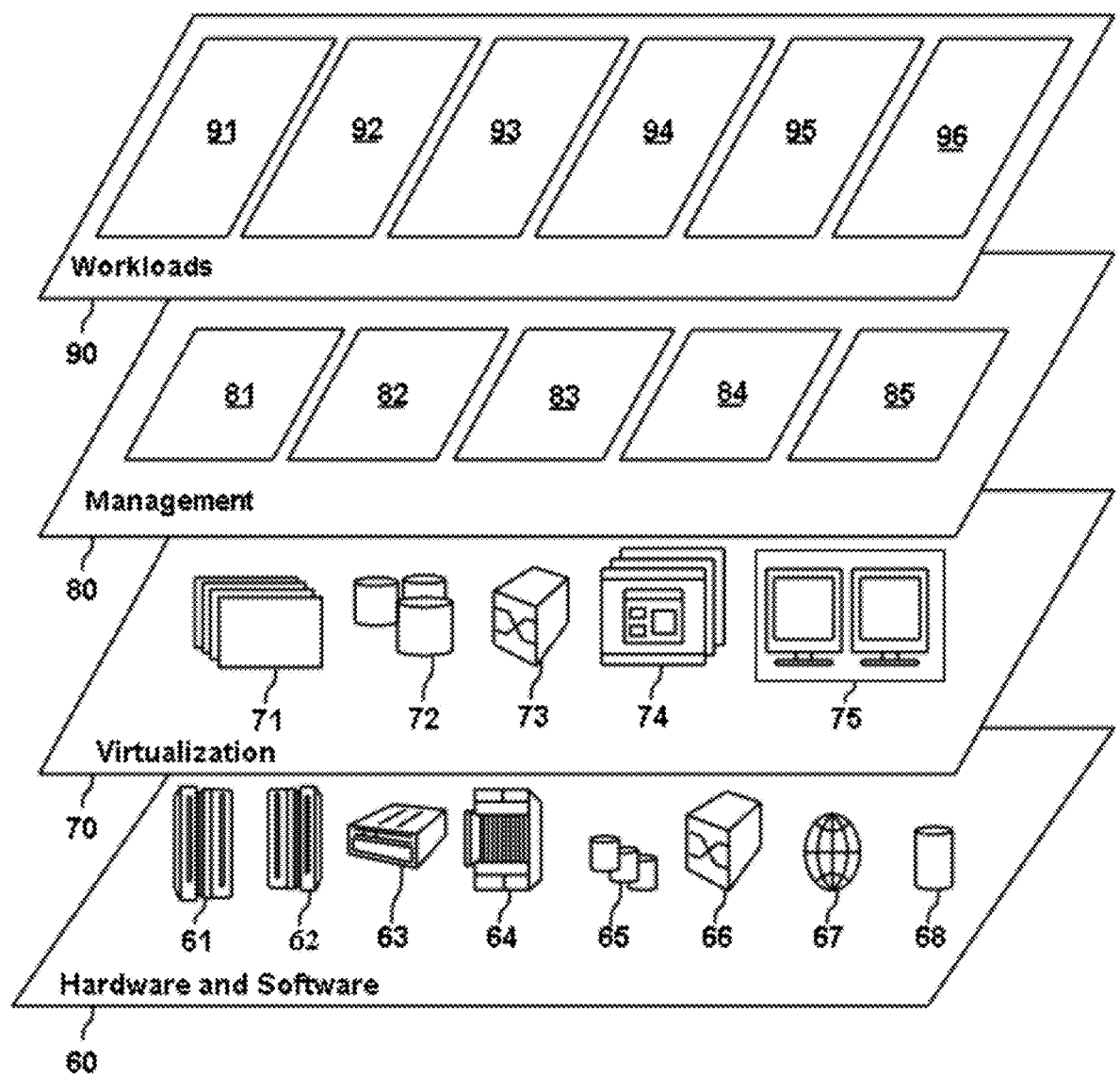
FIG. 3 depicts abstraction model layers, according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conditional parallel cloud services managing 96.

As more and more functionalities may be decoupled and wrapped as microservices in existing cloud computing environments, a set of designated target microservices may be invoked by an issuer microservice in an application deployed in the existing cloud computing environments.

Figure 4:
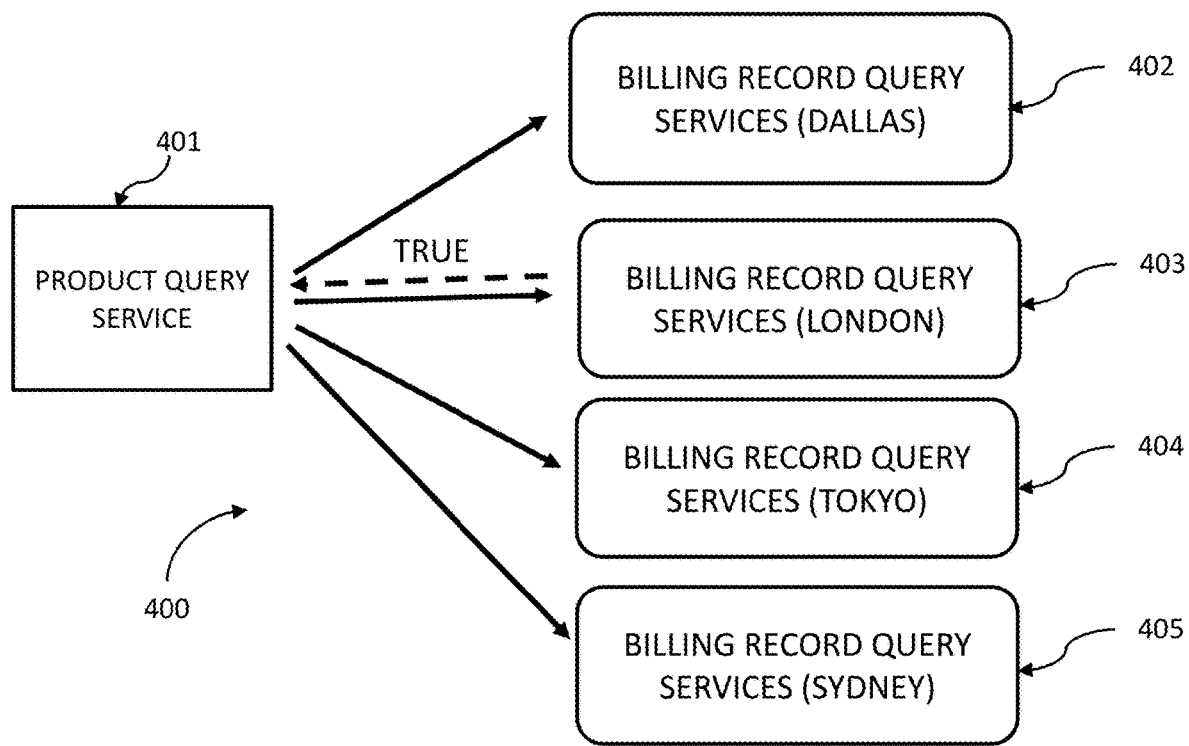
FIG. 4 depicts an exemplary E-Business cloud application decoupled and wrapped as microservices, according to some embodiments of the present disclosure.

FIG. 4 depicts an exemplary E-Business cloud application 400 decoupled and wrapped as microservices. An issuer microservice, referred to as a Product Query Service 401 for the E-Business cloud application 400, may check an existing product catalog (comprising, for example, price, brand, material, manufacturer, size, and the like) for available products. A set of designated target microservices for the E-Business cloud application 400, referred to as a set of Billing Record Query Services (402-405), may be deployed across different regions with records of user billing for being queried. In this embodiment, there is a promotion policy to be used by the E-Business cloud application 400 which is only given to users who bought products and had billing records. In operation, a request for price of a certain product on promotion applied to a user may be received by the Product Query Service 401. The Product Query Service 401 may then send four requests, to Billing Record Query Services (Dallas) 402, to Billing Record Query Services (London) 403, to Billing Record Query Services (Tokyo) 404, and to Billing Record Query Services (Sydney) 405, respectively, for checking whether the user had an existing, prior billing record. A "true" response from a Billing Record Query Services may indicate that the user had a prior billing record at the Billing Record Query Service, while a "false" response from a Billing Record Query Service may indicate that the user had no prior billing record at the Billing Record Query Service. It should be understood this is merely provided as a specific example and should not adversely limit the scope of the disclosure.

Figure 5:
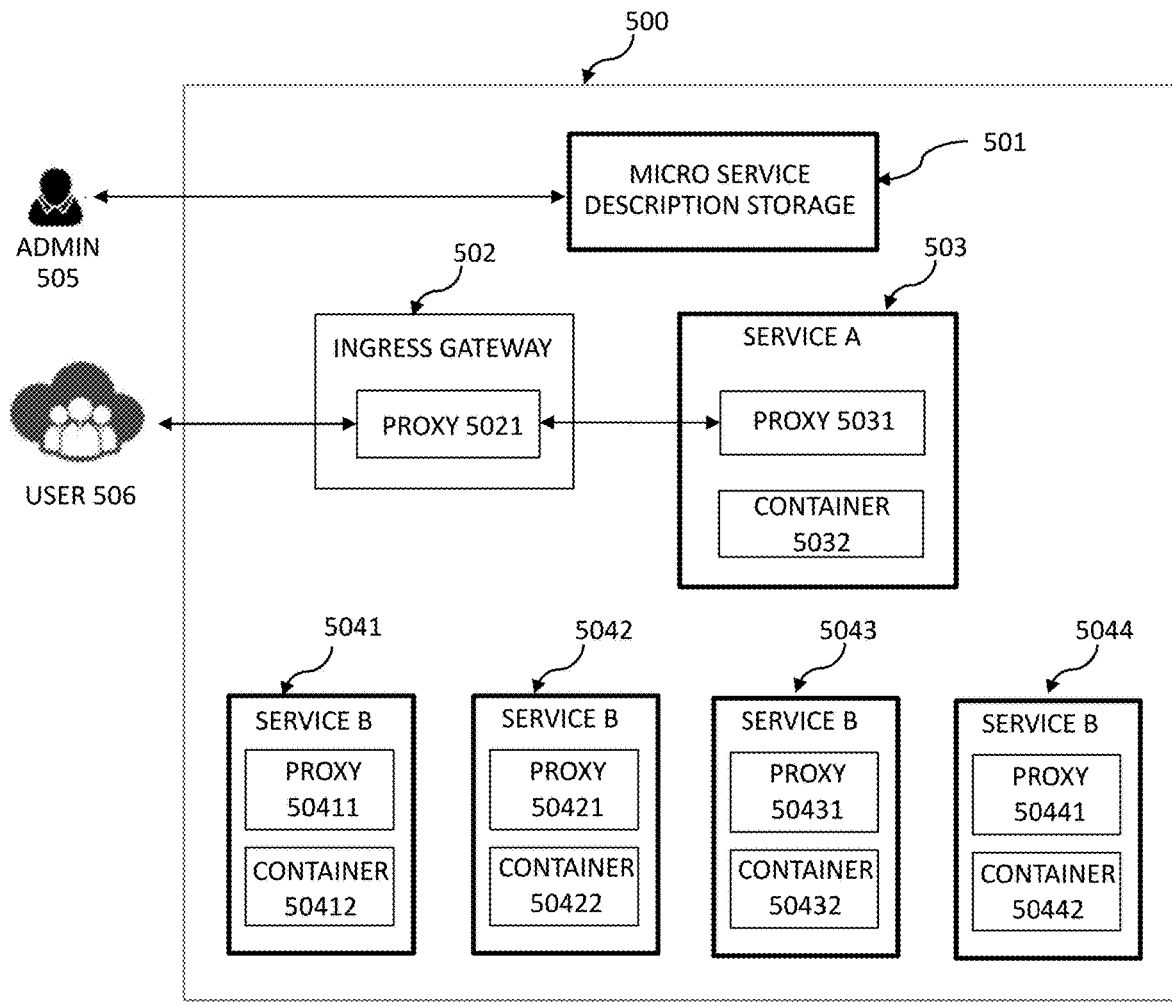
FIG. 5 depicts a schematic diagram of an existing exemplary microservice management environment in which the exemplary E-Business cloud application can be implemented, according to some embodiments of the present disclosure.

FIG. 5 depicts a schematic diagram of an exemplary microservice management environment 500 in which the exemplary E-Business cloud application 400 may be implemented by a composition of several microservices. Referring to FIG. 5, an issuer microservice A 503 may represent the Product Query Service 401 in FIG. 4, a set of designated target microservices B (5041-5044, collectively or individually referred to as 504 (not shown in FIG. 5)) may represent the set of Billing Record Query Services 402-405 in FIG. 4. The exemplary microservice management environment 500 may comprise a microservice description storage 501, an ingress gateway 502, at least one issuer microservice A 503, and at least one designated target microservice 504. Here four designated target microservices B are shown in FIG. 5 for example purposes, and those skilled in the art may understand that other numbers of designated target microservices may be applied, depending on the specific application. Each microservice may be composed of a proxy and a container. For example, the issuer microservice A 503 may be composed of a proxy 5031 and a container 5032, and the target microservice B 5041 may be composed of a proxy 50411 and a container 50412, etc. The respective microservice deployment descriptors of respective microservices A and B may be configured and stored in the microservice description storage 501 by an administrator 505. A microservice deployment descriptor of a microservice may include information such as metadata of the microservice, specific information of the microservice, and the like. FIG. 6A depicts an existing exemplary microservice deployment descriptor for the issuer microservice A and FIG. 6B depicts an existing exemplary microservice deployment descriptor for one of designated target microservices B 5041-5044.

During execution of the E-Business cloud application 400, the proxy 5021 of the ingress gateway 502 may receive a price query request for a certain product on promotion from a user 506, and the proxy 5021 may then send the price query request to the proxy 5031 of the microservice A 503.

In one example implementation, the proxy 5031 of the issuer microservice A 503 may send a request to the proxy 50411 of the microservice B 5041 for checking whether the user 506 had a billing record before at the microservice B 5041. After receiving a "false" response from the proxy 50411 of the microservice B 5041, indicating that there is no prior billing record for the user 506 at the designated target microservice B 5041, the proxy 5031 may send the same request to the proxy 50421 of the microservice B 5042 for checking whether the user 506 had a prior billing record at the microservice B 5042, and so on until the proxy 5031 of the issuer microservice A 503 receives a "true" response from one of the designated target microservices B 5041-5044 indicating that there was a prior billing record for the user 506 at the one of the designated target microservices B 5041-5044. In this embodiment, the logic to control the sending serial requests process is written in the code of A by programmers instead of being provided by the cloud computing environments from the architectural level. The sending serial requests process may need more time than a sending parallel requests process in the E-Business application 400.

In another implementation, the proxy 5031 of the issuer microservice A 503 may send four parallel requests respectively to the designated target microservices B 5041-5044 and may get four responses from microservice B 5041-5044. The microservice A 503 may get final results based on the four responses. Still, in this embodiment, the logic to control the process of sending four parallel requests is written in the code of microservice A 503 by programmers instead of being provided by the cloud computing environments from the architectural level.

Referring back to FIG. 4, those skilled in the art may understand that if the Product Query Service 401 receives a "true" response from the Billing Record Query Services (London) 403 but has not received responses from the other three Billing Record Query Services 402, 404 and 405, the Product Query Service 401 may determine that the user had a prior billing record, and the Product Query Service 401 may cancel the three parallel requests to the Billing Record Query Services (Dallas) 402, the Billing Record Query Services (Tokyo) 404, and the Billing Record Query Services (Sydney) 405, which have not completed, to save time and system resources. In other words, referring now to FIG. 5, if the response of the microservice B 5042 is "true", i.e., the microservice B 5042 has confirmed that there was a prior billing record for the user 506, then there is no need for the proxy 5031 of the microservice A 503 to wait for responses from other unresponsive designated target microservices, e.g., the designated target microservices which have not provided responses. However, the existing proxy 5031 of the microservice A 503 may not be able to support this function using code written by developers. Instead, the existing proxy 5031 of the microservice A 503 may need to get the four responses of all of the designated target microservices B 5041-5044 and then determine the final result.

Stated differently, the controlling process of sending requests in the application in the existing microservice management environment 500 is at the code level, and the issuer of microservice A 503 may not be able to be configured to invoke a plurality of designated target microservices in parallel from the architectural level. This existing microservice management environment 500 lacks flexibility and may not be able to achieve the purpose of saving time and resources for the above E-business application. Thus, there is a need to provide an improved cloud computing environment to solve the above problem from the architectural level. It will be described in more detail below in combination with FIG. 7.

Figure 7:
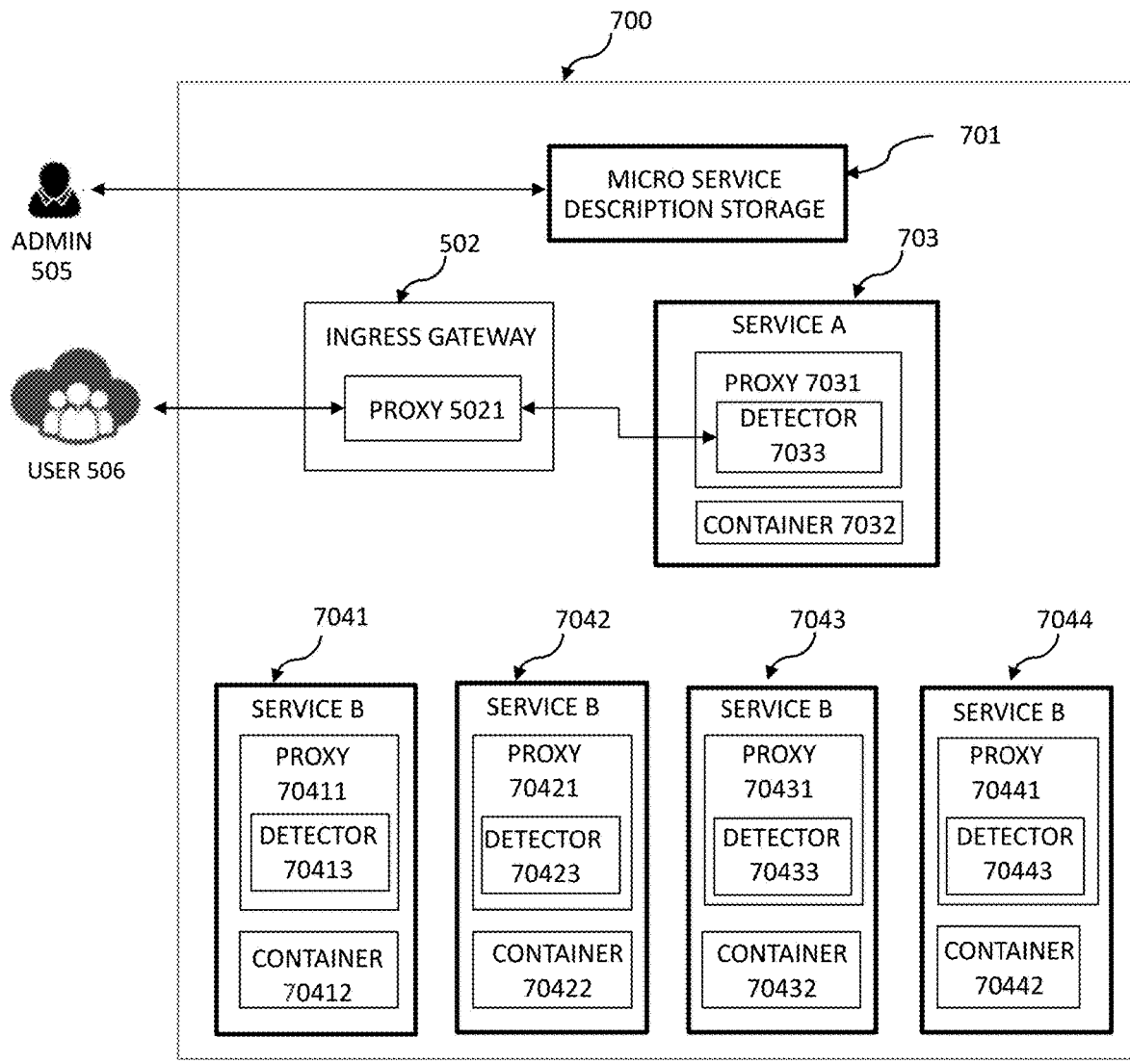
FIG. 7 depicts a schematic diagram of a proposed exemplary microservice management environment, in which the exemplary E-Business cloud application can be implemented, according to some embodiments of the present disclosure.

FIG. 7 depicts a schematic diagram of a proposed exemplary microservice management environment 700 in which the exemplary E-Business cloud application 400 may be implemented, according to some embodiments of the present disclosure. It is also noted that like and corresponding elements in FIG. 5 and FIG. 7 are referred to by like reference numerals. Now referring to FIG. 7, similar to FIG. 5, the proposed exemplary microservice management environment 700 may comprise a microservice description storage 701, an ingress gateway 502, at least one issuer microservice A 703, and a set of designated target microservices B 7041-7044. Each of the microservices may be composed of a proxy and a container, and each container may comprise a detector. For example, the issuer microservice A 703 may be composed of a proxy 7031 and a container 7032 and the proxy 7031 may comprise a detector 7033, and the target microservice B 7041 may be composed of a proxy 70411 and a container 70412 and the proxy 70411 may comprise a detector 70413, etc. All components in the microservice management environment 700 may be connected directly or indirectly via a communication network.

The communication network in FIG. 7 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Each component in the microservice management environment 700 may be, for example, a mobile device, a telephone, a personal digital assistant, a netbook, a laptop computer, a tablet computer, a desktop computer, or any type of computing device capable of running a program and accessing a network. The microservice management environment 700 may operate in a cloud computing service model, such as Software as a Service (SaaS), Platform as a Service (PaaS), or Infrastructure as a Service (IaaS). The microservice management environment 700 may also be located in a cloud computing deployment model, such as a private cloud, community cloud, public cloud, or hybrid cloud.

In some embodiments, the respective microservice deployment descriptors of respective microservice A and microservice B, either an issuer microservice or a designated target microservice, may be configured and stored in the microservice description storage 701 by the administrator 505. A microservice deployment descriptor of a service may include information such as metadata of the service, specific information of the service, and the like. Specifically, a dispatching for joining description and a joining probe description may be included in the issuer microservice and a dispatching for joining cancellation description may be included in the designated target microservice.

FIG. 8A depicts a proposed exemplary issuer microservice deployment descriptor for the issuer microservice A 703, according to some embodiments of the present disclosure. Besides information such as metadata of the service, specific information of the service, and the like, the issuer microservice deployment descriptor may also include a dispatching for joining description 801 and a joining probe description 802. The dispatching for joining description 801 of an issuer microservice may include information of designated target microservices to be invoked by the issuer microservice, such as target microservice name (labelRegex: B) and the number of the designated target microservices (init_pod_number: 4). The joining probe description 802 of an issuer microservice may include information of a predefined condition and actions to be executed by the issuer microservice once the predefined condition is satisfied. For example, the information of the predefined condition and the actions to be executed by the issuer microservice once the predefined condition is satisfied may be included in a file named query_end_check.sh. FIG. 8B depicts a proposed exemplary target microservice deployment descriptor for one of designated target microservices B 5041-5044, according to some embodiments of the present disclosure. A designated target microservice may include a dispatching for joining cancellation description 803. The dispatching for joining cancellation description 803 of a designated target microservice may include information of actions to be executed by the designated target microservice once a cancellation request is received from an issuer microservice. For example, the information of actions to be executed by the designated target microservice may be included in a file named query_cancellation.sh.

The above exemplary issuer/target microservice deployment descriptor are provided for illustrative purposes, and it can be understood that other types of description may be defined, and other information may be added to the issuer/target microservice deployment descriptor. It also can be understood that the issuer/target microservice deployment descriptor for the issuer/target microservice is also provided for illustrative purposes, and other script, such as text files, may also be used to describe necessary information for an issuer microservice, as well as necessary information of the designated target microservices.

FIG. 9A depicts an exemplary file named query_end_check.sh, according to some embodiments of the present disclosure, and FIG. 9B depicts an exemplary file named query_cancellation.sh, according to some embodiments of the present disclosure, both of which may be provided by program developers. It can be understood that both of the script files are provided for illustrative purposes, and other types of scripts expressing the same meaning may be used.

During execution of the E-business application 400, the proxy 5021 of the ingress gateway 502 may receive a price query for a certain product on promotion from the user 506, the proxy 5021 may then send the price query to the proxy 7031 of the issuer microservice A 703. After receiving the price query, the detector 7033 in the proxy 7031 of the issuer microservice A 703 may obtain the microservice deployment descriptor of the issuer microservice, including the information of a plurality of designated target microservices to be invoked by an issuer microservice and a predefined condition and actions to be executed by the issuer microservice once the predefined condition is satisfied. Then the detector 7033 may check whether the plurality of designated target microservices to be invoked by the issuer microservice are available. If the detector 7033 determines that at least one of the plurality of designated target microservices is available, the detector 7033 may send at least one request to the at least one of the plurality of designated target microservices based on the information of the available designated target microservices to be invoked. For example, if three designated target microservices are available, the detector 7033 may send three serial requests continuously without waiting for a response from a previous request, or send three parallel requests simultaneously. Once the detector 7033 receives a response from a designated target microservice, the detector 7033 may check whether the predefined condition is satisfied. If not, the detector 7033 may continue to wait for other responses from unresponsive designated target microservices. If the detector 7033 determines that the predefined condition is satisfied, the detector 7033 may execute the actions to be executed by the issuer microservice once the predefined condition is satisfied.

In some embodiments, if the detector 7033 determines that at least two of the plurality of designated target microservices are available, the detector 7033 may send at least two requests to the at least two of the plurality of designated target microservices respectively in parallel based on the information of the available designated target microservices to be invoked.

In some embodiments, if the detector 7033 determines that all of the plurality of designated target microservices are available, the detector 7033 may send requests to the entire plurality of designated target microservices respectively in parallel based on the information of the available designated target microservices to be invoked.

In some embodiments, the predefined condition may be that a response from one of the plurality of designated target microservices satisfies a predefined requirement, such as the predefined requirement is that the response is "TRUE". In some embodiments, the predefined condition may be that the number of responses from the plurality of designated target microservices reaches a predefined number. For example, a predefined number may be set to "3", that is, the detector 7033 may send five requests in parallel, but if the detector 7033 receives three responses, the predefined condition is satisfied.

In an example, the detector 7033 may first receive a "false" response from the designated target microservice B 7041 and may determine that the predefined condition is unsatisfied, and the detector 7033 may continue to wait for other responses from the unresponsive designated target microservices. The detector 7033 may then receive a "true" response from the designated target microservice B 7042 and may determine that the predefined condition described in the joining probe description is satisfied, and the detector 7033 may execute the actions to be executed by the issuer microservice once the predefined condition is satisfied.

In some embodiments, the actions to be executed by the issuer microservice once the predefined condition is satisfied may comprise sending further requests in parallel to unresponsive desigend target microservices. Still referring to the above example, the detector 7033 may send two further requests to the designated target microservices B 7043 and B 7044 in parallel.

In some embodiments, one of the further requests indicates that the issuer microservice may request an unresponsive desigend target microservice to cancel an original request sent to the unresponsive desigend target microservice. Thus, in the above example, the detector 7033 may request to cancel the two original requests sent to both designated target microservice B 7043 and microservice B 7044 in its two further requests.

In some embodiments, during execution of the application, each of designated target microservices B 7041-7044 may take similar actions. In the following description, the designated target microservice B 7041 is used as an example. Once the code of the designated target microservice B 7041 is started up, the detector 70413 of the designated target microservice B 7041 may obtain the microservice deployment descriptor of the designated target microservice B 7041, including the information of actions to be executed by the designated target microservice B 7041 once a further request is received from an issuer microservice A 703. Once the detector 70413 receives an original request for checking whether the user had a prior billing record at the designated target microservice B 7041 from an issuer microservice A 703, the designated target microservice B 7041 may attempt to obtain a response to the request by executing code in the designated target microservice B 7041 and then may send the response to the issuer microservice A 703. Then the designated target microservice B 7041 is ended, and the designated target microservice B 7041 may be invoked by other issuer microservices. In some embodiments, once the detector 70413 receives an original request for checking whether the user had a prior billing record at the designated target microservice B 7041 from an issuer microservice A 703, the designated target microservice B 7041 may attempt, but ultimately fail, to timely obtain a response to the original request by executing code in the designated target microservice B 7041. In this case, the designated target microservice B 7041 is an unresponsive designated target microservice. At this time, the detector 70413 may receive a further request from an issuer microservice A 703, and the detector 70413 may execute the actions to be executed by the unresponsive designated target microservice B 7041 once the further request is received from an issuer microservice A 703 obtained from the microservice deployment descriptor. In some embodiments, the actions to be executed by the unresponsive designated target microservice may comprise cancelling the original request sent to the unresponsive designed target microservice B 7041. Then the detector 70413 of the unresponsive designated target microservice B 7041 may stop executing the original request sent to the detector 70413.

Continuing the above example, once the detectors 70433 and 70443 of the unresponsive designated target microservices B 7043 and 7044 receive two parallel further requests for cancelling the original requests received from the detector 7033 of the issuer microservice A 7031, the detectors 70433 and 70443 of the unresponsive designated target microservices B 7043 and 7044 may stop attempting to obtain responses to the original requests, e.g., cancel the original requests from the detector 7033 of the issuer microservice A 703. Then the designated target microservices B 7043 and 7044 are ended, and the designated target microservices B 7043 and 7044 may be invoked by other issuer microservices.

In some embodiments, status of microservices may be maintained in the microservice description storage 701. The detector 7033 in the proxy 7031 of the issuer microservice A 703 may check the status of designated target microservices B 7041-7044 before sending a plurality of parallel requests to the plurality of designated target microservices B 7041-7044 based on the dispatching for joining description. If the number of the available designated target microservices B maintained in the microservice description storage 701 is enough (for example, four designated target microservices B are available) for sending a plurality of parallel requests to a plurality of designated target microservices B 7041-7044, based on the information of the plurality of designated target microservices, the detector 7033 may send the plurality of parallel requests. Otherwise (for example, less than four of the plurality of the designated target microservices B are available), the detector 7033 may send requests to the available designated target microservices maintained in the microservice description storage 701 and check whether other designated target microservices to be invoked maintained in the microservice description storage 701 are available. Once there is at least one available designated target microservice, the detector 7033 may continue to invoke the one or more available designated target microservices until the number of designated target microservice being invoked satisfies the number needed.

In accordance with the cloud computing environment as proposed herein, an issuer microservice may send a plurality of parallel requests to a plurality of designated target microservices and may stop part of the designated target microservices in some conditions from the architectural level, which makes it easier for developers to write and change code for a microservice. Additionally, running time for an application and resources used for the application can be saved.

Figure 10:
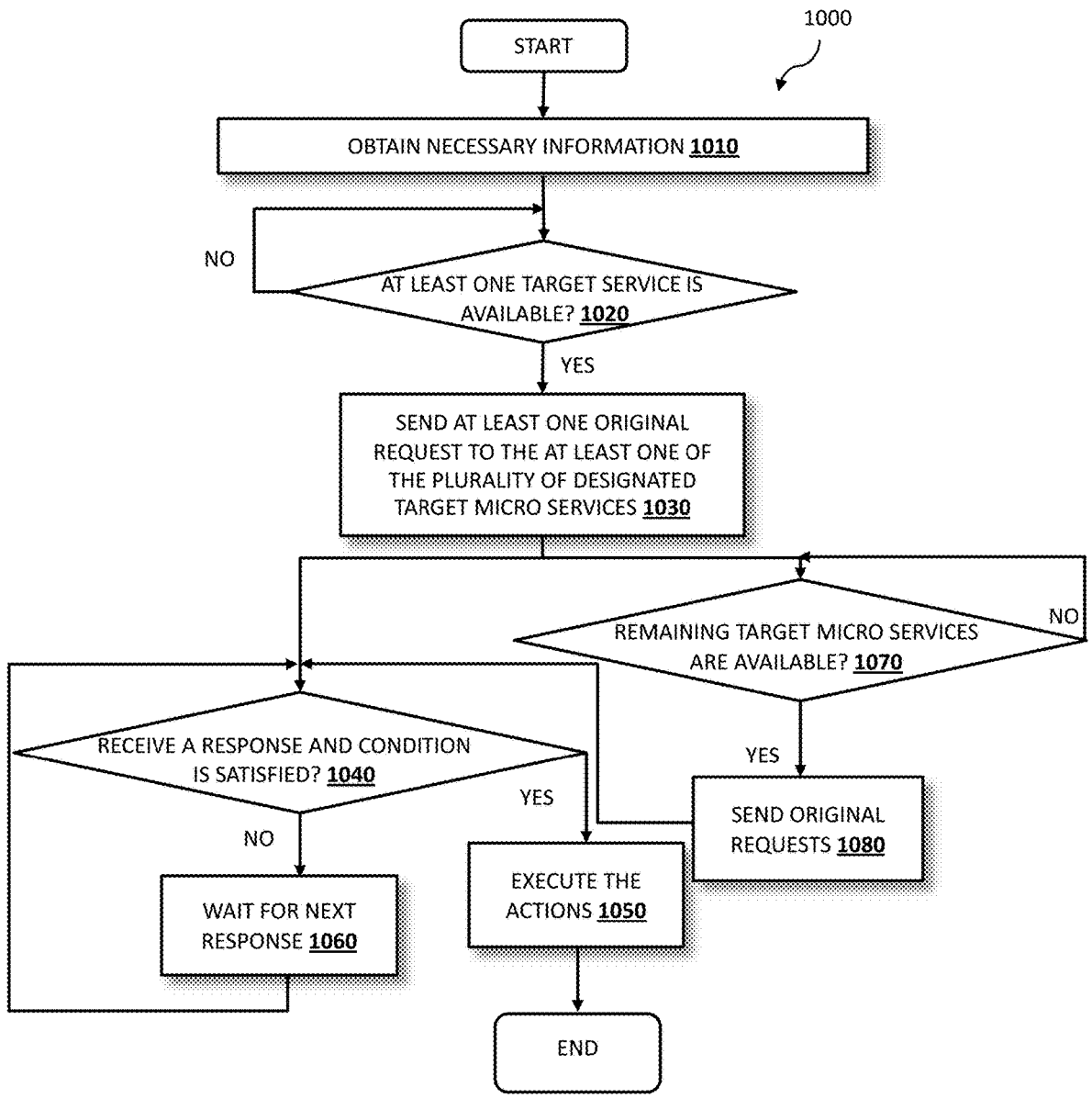
FIG. 10 depicts a flowchart of an exemplary method 1000 for managing conditional parallel cloud services, according to some embodiments of the present disclosure.

FIG. 10 depicts a flowchart of an exemplary computer-implemented method 1000 for managing conditional parallel cloud services, according to some embodiments of the present disclosure. The method 1000 may be implemented by a detector 7033 of a proxy 7031 of an issuer microservice A 703, or other suitable computer/computing systems. For ease of understanding, the method 1000 will be described with reference to FIG. 7.

At 1010, the detector 7033 may obtain information of a plurality of designated target microservices B 7041-7044 to be invoked by an issuer microservice A 703, a predefined condition, and actions to be executed by the issuer microservice A 703 once the predefined condition is satisfied. For example, all of the above information obtained by the detector 7033 may be configurable and maintained in a storage, such as in the microservice description storage 701. In some embodiments, all of the above information may be parsed from a microservice deployment descriptor of the issuer microservice A 703, which may be stored in the microservice description storage 701.

In some embodiments, the predefined condition may be one of the following: a response from one of the plurality of designated target microservices B 7041-7044 satisfies a predefined requirement; and the number of responses from the plurality of designated target microservices B 7041-7044 reaches a predefined number.

In some embodiments, the actions to be executed by the issuer microservice A 703 may comprise sending further requests in parallel to unresponsive designed target microservices B. In some embodiments, one of the further requests indicates that the issuer microservice may request an unresponsive designed target microservice to cancel an original request sent to the unresponsive designed target microservice.

In some cases, all microservice deployment descriptors, either for issuer microservice A 703 or for target microservices B 7041-7044, may be configurable by the administrator 505 and maintained in the microservice description storage 701. Status of microservices, either issuer microservices A 703 or target microservices B 7041-7044, may be recorded and maintained in the microservice description storage 701.

At 1020, the detector 7033 may determine whether at least one the plurality of designated target microservices B 7041-7044 are available, such as by searching status of all the plurality of designated target microservices B in the microservice description storage 701. It can be understood that the detector 7033 may determine whether at least one the plurality of designated target microservices B 7041-7044 are available in other ways, such as checking each status of the plurality of designated target microservices B 7041-7044 online directly.

At 1030, in response to the at least one the plurality of designated target microservices B 7041-7044 being available, the detector 7033 may send at least one original request to the available designated target microservices B based on the information of the available designated target microservices. For example, if three designated target microservices are available in FIG. 7, the detector 7033 may send three serial requests continuously, without waiting for a response from a previous request, or send three parallel requests simultaneously. In some embodiments, in response to at least two of the plurality of designated target microservices B 7041-7044 being available, the detector 7033 may send at least two original requests to the available designated target microservices B in parallel based on the information of the available designated target microservices. If the detector 7033 determines that there is no available designated target microservices B 7041-7044, the method 1000 may go back to 1020 to continue to check.

At 1040, the detector 7033 may determine whether the predefined condition is satisfied after receiving a response from one (such as microservice B 7042) of the plurality of designated target microservices B 7041-7044. In some embodiments, in response to receiving a response from one (such as microservice B 7042) of the plurality of designated target microservices B 7041-7044 and the predefined condition being satisfied (the response is "TRUE"), the detector 7033, at 1050, may execute the actions to be executed by the issuer microservice, e.g., sending further requests to the unresponsive designed target microservices in parallel. Then the method 1000 ends.

In some embodiments, in response to receiving a response from one (such as microservice B 7041) of the plurality of designated target microservices B 7041-7044 and the predefined condition being unsatisfied (the response is "FALSE"), the detector 7033, at 1060, may wait for a next response from one (one of 7042-7044) of unresponsive designed target microservices B 7041-7044. Then the method 1000 may proceed to 1040 to continue a new determination.

In some embodiments, in response to at least one of the plurality of designated target microservices to be invoked by the issuer microservice being available (such as where only microservice B 7041 and microservice B 7042 are available), the detector 7033, at 1070, may check whether the remaining designated target microservices (microservice B 7043 and microservice B 7044) of the plurality of designated target microservices B 7041-7044, excluding the part of the plurality of designated target microservices (microservice B 7041 and microservice B 7042), are available; then, at 1080, detector 7033 may send at least one original request to at least one (microservice B 7043) of the remaining of the plurality of designated target microservices (microservice B 7043 and microservice B 7044) in parallel in response to at least one (microservice B 7043) of the remaining of the plurality of designated target microservices (microservice B 7043 and microservice B 7044) being available. The method then may proceed to 1040. If there are still designated target microservices (microservice B 7044) of the plurality of designated target microservices B 7041-7044 excluding the at least one of the plurality of designated target microservices (microservice B 7041 and microservice B 7042) that are unavailable, the detector 7033 may wait until all remaining (microservice B 7043 and microservice B 7044) of the plurality of designated target microservices B 7041-7044 are available.

In some embodiments, each of the plurality of designated target microservices B 7041-7044 may obtain information of the actions to be executed by the designated target microservice before the further request is received and may execute actions to be executed by an unresponsive designated target microservice in response to receiving the further request before providing responses. In some embodiments, the actions to be executed by the unresponsive designated target microservice among the designated target microservices B 7041-7044 once the further request is received may comprise cancelling an original request sent to the unresponsive designed target microservice.

The proposed method can make it easier for developers to write and change code for a microservice. In addition, running time for an application and resources used for the application can be saved using the proposed method.

It should be noted that the processing of managing conditional parallel cloud services according to embodiments of the present disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by one or more processors, information pertaining to respective target microservices of a plurality of target microservices to be invoked by an issuer microservice;
   sending, by one or more processors, a first request to available target micro services of the plurality of target microservices based, at least in part, on the information pertaining to the respective available target microservices;
   in response to receiving a response to the first request from an available target microservice of the available target microservices, determining, by one or more processors, whether a predefined condition is satisfied; and
   in response to determining that the predefined condition is satisfied, sending, by one or more processors, a second request in parallel to respective unresponsive available target microservices of the available target microservices, wherein the second request requests the unresponsive available target microservices to cancel the first request.

2. The computer-implemented method of claim 1, wherein the first request is sent to the available target microservices respectively in parallel.

3. The computer-implemented method of claim 1, wherein the predefined condition is that the response satisfies a predefined requirement.

4. The computer-implemented method of claim 1, wherein the predefined condition is that a number of responses from the plurality of target microservices that satisfy a predefined requirement reaches a predefined number.

5. The computer-implemented method of claim 1, further comprising:
   determining, by one or more processors, whether remaining target microservices of the plurality of target microservices, excluding the available target microservices, are available, and
   in response to at least one of the remaining target microservices being available, sending, by one or more processors, the first request to the at least one of the remaining target microservices.

6. The computer-implemented method of claim 1, wherein one or more actions to be taken in response to the predefined condition being satisfied are configurable and maintained by a storage.

7. The computer-implemented method of claim 1, further comprising:
   in response to determining that the predefined condition is unsatisfied, waiting, by one or more processors, for a next response from another available target microservice of the available target microservices.

8. A computer program product comprising a computer readable storage medium having program instructions embodied therewith, the program instructions executable by a processor to cause the processor to perform operations including:
   identifying information pertaining to respective target microservices of a plurality of target microservices to be invoked by an issuer microservice;
   sending a first request to available target microservices of the plurality of target microservices based, at least in part, on the information pertaining to the respective available target microservices;
   in response to receiving a response to the first request from an available target microservice of the available target microservices, determining whether a predefined condition is satisfied; and
   in response to determining that the predefined condition is satisfied, sending a second request in parallel to respective unresponsive available target microservices of the available target microservices, wherein the second request requests the unresponsive available target microservices to cancel the first request.

9. The computer program product of claim 8, wherein the first request is sent to the available target microservices respectively in parallel.

10. The computer program product of claim 8, wherein the predefined condition is that the response satisfies a predefined requirement.

11. The computer program product of claim 8, wherein the predefined condition is that a number of responses from the plurality of target microservices that satisfy a predefined requirement reaches a predefined number.

12. The computer program product of claim 8, the operations further including:
    determining whether remaining target microservices of the plurality of target microservices, excluding the available target microservices, are available, and
    in response to at least one of the remaining target microservices being available, sending the first request to the at least one of the remaining target microservices.

13. The computer program product of claim 8, wherein one or more actions to be taken in response to the predefined condition being satisfied are configurable and maintained by a storage.

14. The computer program product of claim 8, the operations further including:
    in response to determining that the predefined condition is unsatisfied, waiting for a next response from another available target microservice of the available target microservices.

15. A computer system comprising:
    a processing unit; and
    a memory coupled to the processing unit and storing instructions thereon, the instructions, when executed by the processing unit, performing operations including:

identifying information pertaining to respective target microservices of a plurality of target microservices to be invoked by an issuer microservice;

sending a first request to available target microservices of the plurality of target microservices based, at least in part, on the information pertaining to the respective available target microservices;

in response to receiving a response to the first request from an available target microservice of the available target microservices, determining whether a predefined condition is satisfied; and in response to determining that the predefined condition is satisfied, sending a second request in parallel to respective unresponsive available target microservices of the available target microservices, wherein the second request requests the unresponsive available target microservices to cancel the first request.

16. The computer system of claim 15, wherein the first request is sent to the available target microservices respectively in parallel.

17. The computer system of claim 15, wherein the predefined condition is that the response satisfies a predefined requirement.

18. The computer system of claim 15, wherein the predefined condition is that a number of responses from the plurality of target microservices that satisfy a predefined requirement reaches a predefined number.

19. The computer system of claim 15, wherein one or more actions to be taken in response to the predefined condition being satisfied are configurable and maintained by a storage.

20. The computer system of claim 15, the operations further including:

in response to determining that the predefined condition is unsatisfied, waiting for a next response from another available target microservice of the available target microservices.

* * * * *